US008250308B2

(12) United States Patent
Papazova et al.

(10) Patent No.: US 8,250,308 B2
(45) Date of Patent: Aug. 21, 2012

(54) CACHE COHERENCY PROTOCOL WITH BUILT IN AVOIDANCE FOR CONFLICTING RESPONSES

(75) Inventors: Vesselina K. Papazova, Highland, NY (US); Ekaterina M. Ambroladze, Fishkill, NY (US); Michael A. Blake, Wappingers Falls, NY (US); Pak-kin Mak, Poughkeepsie, NY (US); Arthur J. O'Neill, Jr., Wappingers Falls, NY (US); Craig R. Waters, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 804 days.

(21) Appl. No.: 12/031,977

(22) Filed: Feb. 15, 2008

(65) Prior Publication Data

US 2009/0210626 A1 Aug. 20, 2009

(51) Int. Cl.
*G06F 12/00* (2006.01)

(52) U.S. Cl. ........ 711/141; 711/144; 711/145; 711/146; 711/147

(58) Field of Classification Search ........................ None
See application file for complete search history.

(56) References Cited

U.S. PATENT DOCUMENTS

| 5,862,316 A | 1/1999 | Hagersten et al. |
|---|---|---|
| 6,463,514 B1 | 10/2002 | Ray et al. |
| 6,738,871 B2 | 5/2004 | Van Huben et al. |
| 7,085,898 B2 * | 8/2006 | Blake et al. .................... 711/147 |
| 7,111,130 B2 | 9/2006 | Blake et al. |

OTHER PUBLICATIONS

John B. Carter, et al., Implementation and Performance of Munin, Computer Systems Laboratory, Rice University, Houston, Texas, 1991, pp. 152-164.
Michel Dubois, et al., Memory Access Buffering in Multiprocessors+, IEEE, 1986, pp. 434-442.
z/Architecture: "Principles of Operation"; Sixth Edition, Apr. 2007, Publication No. SA22-7832-05, copyright IBM Corp. 1990-2007, p. 1-1218.

* cited by examiner

*Primary Examiner* — Jared Rutz
*Assistant Examiner* — Alan Otto
(74) *Attorney, Agent, or Firm* — Cantor Colburn LLP; John Campbell (57) ABSTRACT

The method includes initiating a processor request to a cache in a requesting node and broadcasting the processor request to remote nodes when the processor request encounters a local cache miss, performing a directory search of each remote cache to determine a state of a target line's address and an ownership state of a specified address, returning the state of the target line to the requesting node and forming a combined response, and broadcasting the combined response to each remote node. During a fetch operation, when the directory search indicates an IM or a Target Memory node on a remote node, data is sourced from the respective remote cache and forwarded to the requesting node while protecting the data, and during a store operation, the data is sourced from the requesting node and protected while being forwarded to the IM or the Target Memory node after coherency has been established.

19 Claims, 6 Drawing Sheets

CACHE COHERENCY PROTOCOL WITH BUILT IN AVOIDANCE FOR CONFLICTING RESPONSES

BACKGROUND OF THE INVENTION

This invention relates generally to a method for cache coherency protocol with built in avoidance for conflicting responses in a multi-node system, and more particularly to providing a method, system and computer program product capable of establishing and maintaining cache coherency in a "switchless" distributed shared memory computer system.

Figure 1:
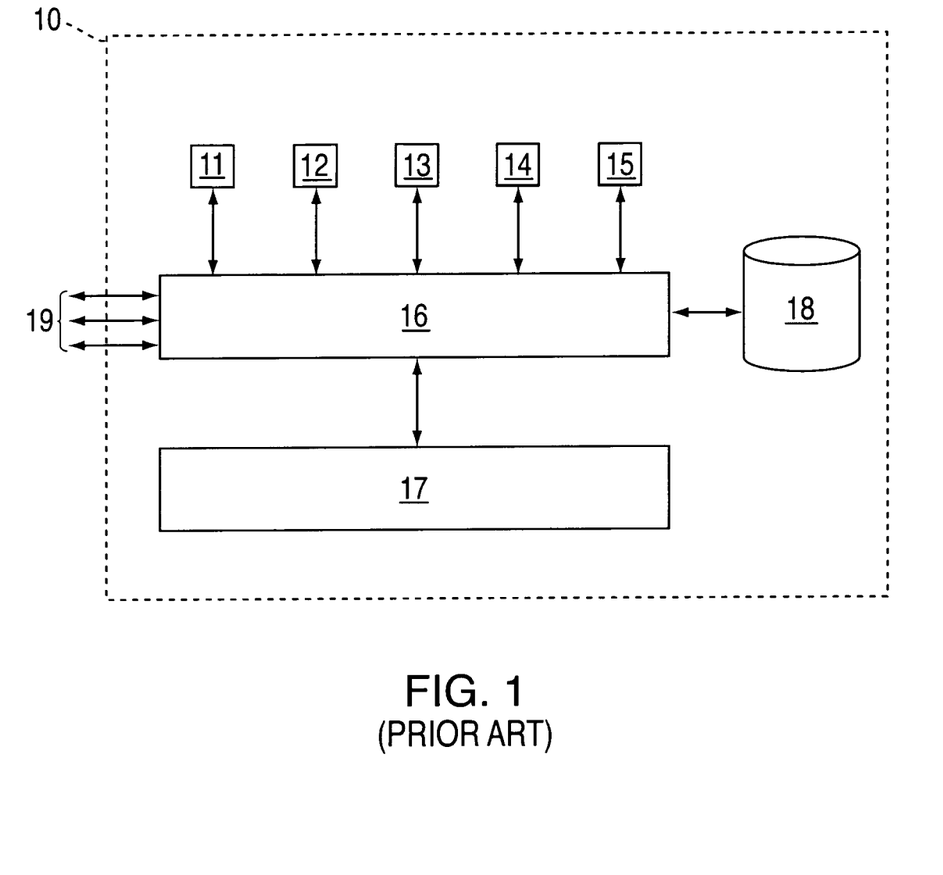
FIG. 1 illustrates a conventional node of a multi-node system.

Computer systems have developed from a single processor system to a large symmetric multi-processor (SMP) system. FIG. 1 illustrates a conventional node 10 of a symmetric multiprocessing computer system, including a plurality of processors 11-15 with associated cache and directory, interconnected by a shared level of cache 16 with associated directory, a storage 17 shared amongst the system's processors, and common I/O devices 18 interconnected to other nodes within a multi-node system through a plurality of interconnect buses 19. A fetch request targeting a given line entering the system can be initiated by any of the plurality of processors 11-15 that upon missing the processor's private cache will traverse the system in search of a target line address and associated data. Upon the cache miss, the request initially enters the shared level of cache 16, and accesses the cache's directory to determine if the target line exists in the shared level of cache. If the line exists in the shared level of cache, commonly referred to as a directory hit, the processor's request will potentially be satisfied and the target lines data is returned to the requesting processor. However, if a directory miss is encountered or the line exists in the shared level of cache but in a state that does not satisfy the processors request, i.e. a read-only hit when the fetch request is for exclusivity, a request will be launched to remote nodes through the interconnect buses 19, or to the locally attached shared storage 17 of node 10.

Methods for maintaining cache coherency have become a critical design point in large SMP systems. Maintaining coherency across caches located on different nodes is a very complicated task. With every new SMP design, a unique set of complex issues arises, such as issues related to operation stalling, data coherency, or window conditions that require special handling.

Figure 2:
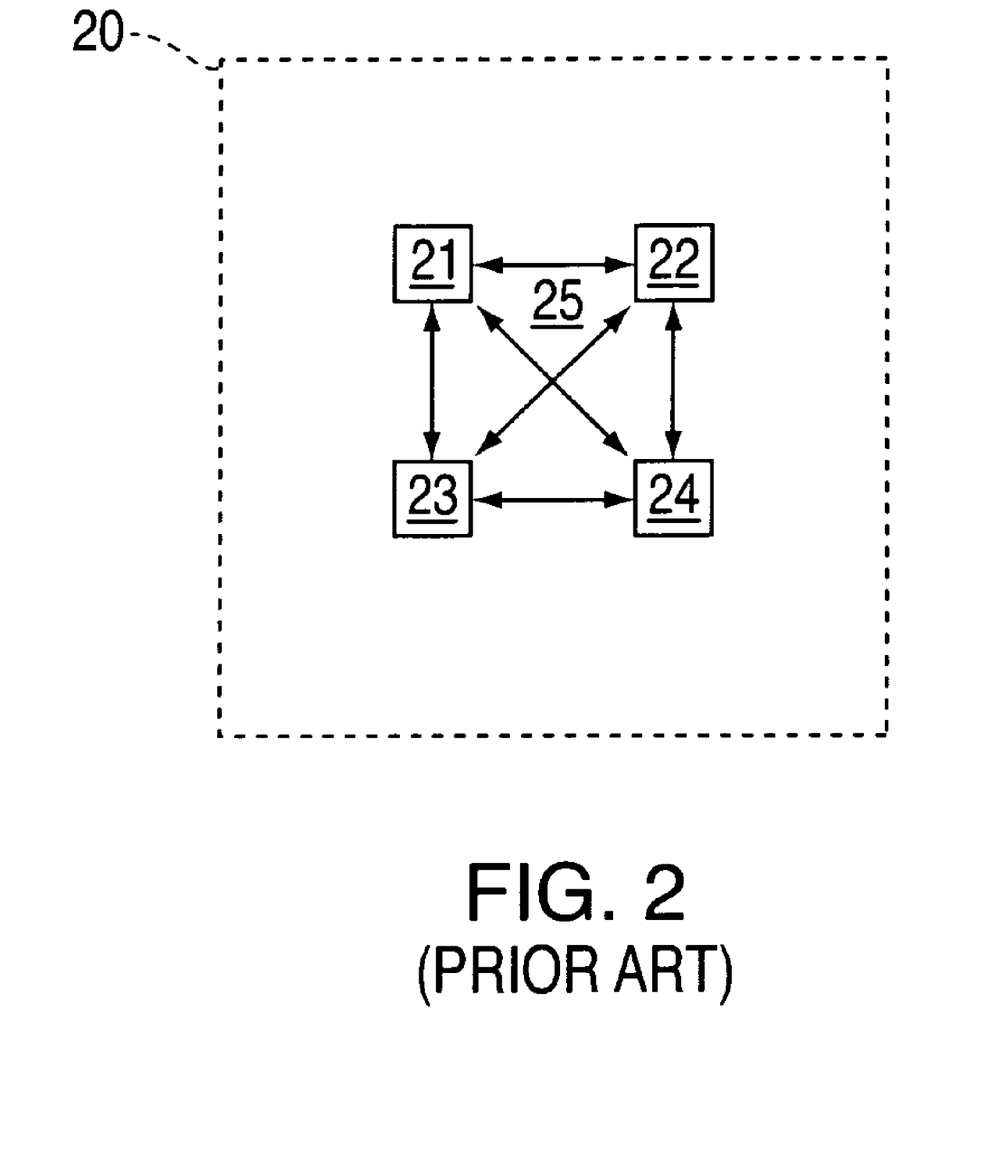
FIG. 2 illustrates a conventional multi-node system.

In existing large SMP systems, overall system performance has grown dramatically, resulting in additional cache levels being required, and an increase in cache sizes. With the introduction of each new cache levels, maintaining data integrity has become more complex. In order to overcome the complexity issue, system designs include the use of a fully connected topology to allow simpler handling of the cache coherency across multiple nodes and smaller latency penalties in reaching each node. FIG. 2 illustrates a fully connected system topology of a multi-node system 20 including a plurality of interconnect buses 25, connecting a multitude of remote nodes 21-24, which follow a given coherency protocol. Each remote node 21-24 includes the same elements as shown in FIG. 1, providing for a plethora of processors within the multi-node system 20, and a larger aggregate shared level of system cache. Even with the use of a fully connected topology, there are still window conditions which could result in a given operations initially detecting a reject condition on one remote node (21, 22, 23 or 24) while another remote node (21, 22, 23 or 24) indicates that it has the highest coherency point in the system 20 and will be able to process the operation. This can create scenarios that if not addressed may lead to data integrity problems.

It would be desirable to be able to prevent conflict cache state detection across multiple caches in a multi-node system.

BRIEF SUMMARY OF THE INVENTION

An exemplary embodiment includes a method for cache coherency protocol with built in avoidance for conflicting responses in a multi-node system including a plurality of nodes interconnected with each other, each node having a plurality of processors, a cache, a plurality of I/O adapters, a plurality of controllers to perform cache coherent operations, and a main memory.

The method includes initiating a processor request to a shared level of cache in a requesting node of the plurality of nodes and broadcasting the processor request to remote nodes of the plurality of nodes when the processor request encounters a local cache miss, performing a directory search of each remote cache to determine a state of a target line's address in each remote cache and an ownership state of a specified address, returning the state of the target line from each of the remote nodes to the requesting node and merging the partial responses together to form a combined response indicating a coherent state of the line in the multi-node system and broadcasting the combined response to each remote nodes. During a fetch operation, when the directory search indicates an Intervention Master (IM) or a Target Memory Node on a remote node, data is sourced from the respective remote cache and forwarded the data to the requesting node while protecting the data. During a store operation, the data is sourced from the requesting node and protected the data while forwarding the data to the Intervention Master (IM) or the Target Memory node after coherency has been established in the multi-node system. Upon completion of the cache coherent operations, a final response is sent to the requesting node and a completion response is returned to the requesting processor.

Another exemplary embodiment includes a multi-node system including a plurality of nodes interconnected with each other, each node comprising a plurality of processors, a cache, a plurality of I/O adapters, a plurality of controllers to perform cache coherent operations, and a main memory. The multi-node system includes a requesting processor which initiates a processor request to a shared level of cache in a requesting node of the plurality of nodes and the processor request is broadcasted to remote nodes of the plurality of nodes when the processor request encounters a local cache miss. Further, a directory search is performed of each remote cache to determine a state of a target line's address in each remote cache and an associated ownership state of a specified address, and the remote nodes send partial responses including state of the target line to the requesting node based on the directory search performed and the partial responses are merged together to form a combined response indicating a coherent state of the line in the multi-node system and the requesting node broadcasts the combined response to each remote nodes.

According to an exemplary embodiment, during a fetch operation, when the directory search indicates an Intervention Master (IM) or a Target Memory Node on a remote node, data is sourced from the respective remote cache and forwarded to the requesting node while protecting the data, and during a store operation, data is sourced from the requesting node and protecting while forwarding the data to the Intervention Master (IM) or the Target Memory node after coherency has been established in the multi-node system. Upon completion of the cache coherent operations, a final response is sent to the requesting node and a completion response is returned to the requesting processor.

Another exemplary embodiment includes a computer program product corresponding to the above-summarized method.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

Figure 3:
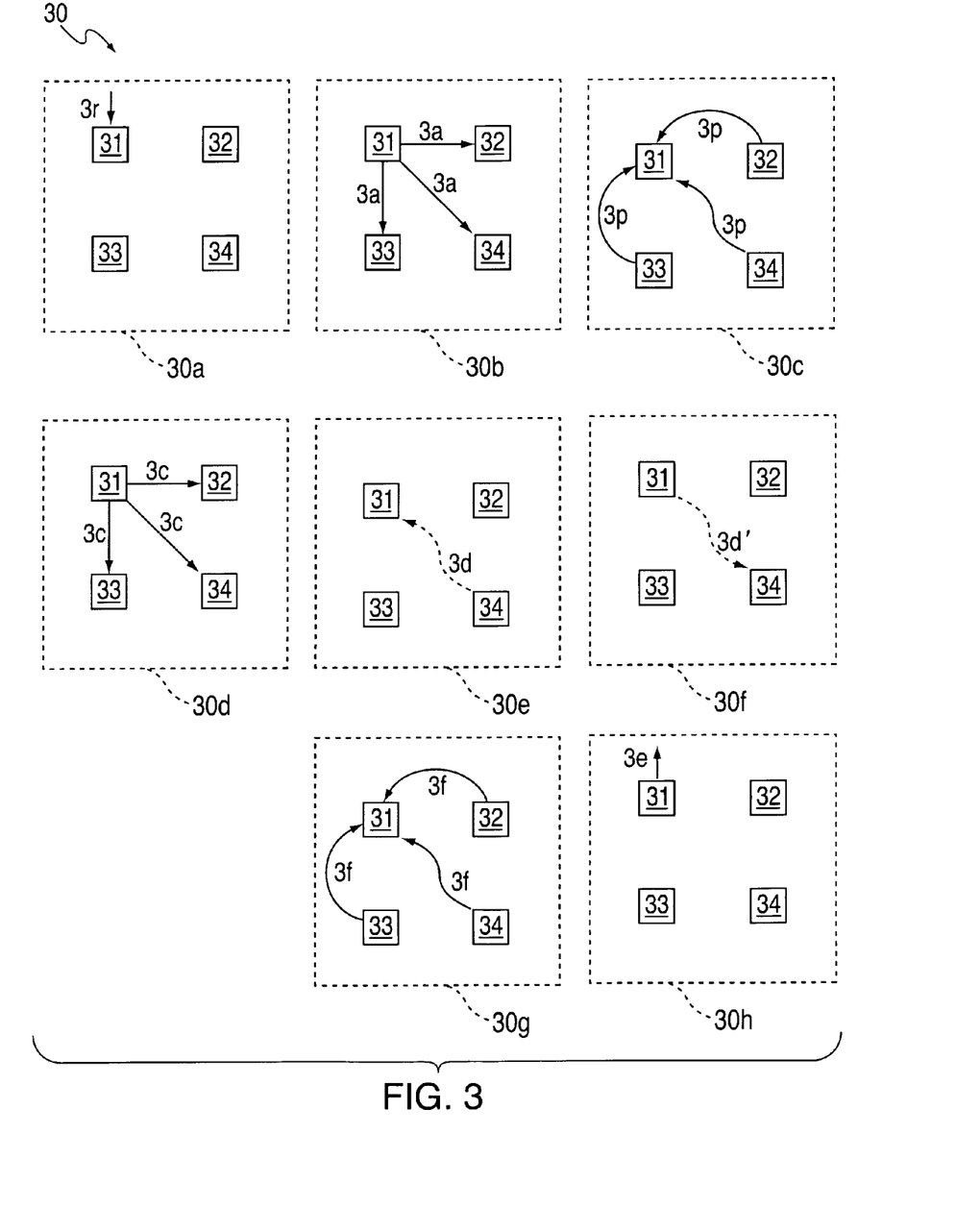
FIG. 3 illustrates a fully connected multi-node coherency protocol that can be implemented within embodiments of the present invention.

Turning now to the drawings in greater detail, it will be seen that in FIG. 3 there is a multi-node system 30 including a plurality of remote nodes 31, 32, 33 and 34. Each node 31-34 within the multi-node system 30 includes the elements as shown in FIG. 1, for example, and each node 31-34 follows a communications protocol includes the following elements as detailed in FIG. 3. As shown, the communication protocol includes an address broadcast 3a, a set of partial responses 3p, a set of combined responses 3c, a potential data responses 3d or 3d', depending on the type of the operation (fetch vs. store), and a set of final responses 3f, which follow each other in a respective order of generation. As shown in block 30a, an initial processor request 3r, is sent to a shared level of cache in the requesting (i.e. local) node 31 of a multi-node system 30. According to an exemplary embodiment, when the initial processor request 3r encounters a local cache miss, in block 30b, an address broadcast 3a is launched to each of the remote nodes 32, 33, 34. The address broadcast 3a broadcasts the requesting node's 31 fetch command and address to each of the remote nodes 32, 33 and 34 in the system 30. Upon entering each remote node 32, 33 and 34, the address broadcast 3a performs a directory search (i.e., lookup) of the directory state of the remote cache to determine the state of the target line's address in the remote cache, as well as potentially sending cross-invalidate requests to the remote processor's, in order to ensure that they rescind ownership of a potentially contended line. Following the directory search, in block 30c, each of the remote nodes 32, 33 and 34 sends a partial response 3p to the requesting node 31 with information indicating the state of the line in each of the remote caches, ranging from exclusive line hit, read only line hit and miss, for example. In block 30d, upon arrival of the partial responses 3p, a consistency check is performed to ensure that inconsistency does not exist between the partial responses 3p and the requesting node 31 then takes each of the partial responses 3p and merges them into a combined response 3c, which indicates the coherent state of the line in the system 30 and broadcasts the combined response 3c to each of the remote nodes 32, 33 and 34.

According to an exemplary embodiment, each time when a coherent operation is being issued on a Node-to-Node Interface, a directory search is performed on all remote nodes (32, 33 and 34) to determine the ownership state of a specified address (i.e., an address of interest). For each address in the cache there is a corresponding ownership tag. This ownership tag contains information regarding the coherency of the line address within the system 30. According to an exemplary embodiment, the ownership tag indicates a cache miss or a cache hit. In the case of a cache hit, the ownership tag also indicates whether the cache on the remote node 32, 33 or 34 is the "Intervention Master" (IM) for the specified address. According to an exemplary embodiment, only one node 32, 33 or 34 within the system 30 can be an Intervention Master for a specified address, which means that the respective node (32, 33 or 34) is the highest coherency point in the system 30 for that address.

In addition to the Intervention Master Bit (IM Bit) which is part of the directory state, when an operation is being processed within a system resource we use a bit called Intervention Master (IM) Pending to protect the address during the window when the data is being manipulated (i.e., updated or moved). At the time of the directory search, the IM Pending bit is set on the node 32, 33 or 34 where the IM bit is indicated in the directory state and no address contentions are detected for that line against another controller that has the IM Pending bit set, this is referred to as an "IM Reject". There are additional conditions which can also set the IM Pending bit on a given node.

The table below list all types of partial responses 3p/combined response 3c with the respective coherency ordering:

| Order | Response |
| --- | --- |
| 1. | IM Hit |
| 2. | IM Reject |
| 3. | MM Reject |
| 4. | Read-Only Hit |
| 5. | Miss |

IM Hit—This response is generated from the Intervention Master node when no address contention is detected. IM Reject—This response indicates that address contention was detected and a full address compare was encountered against another controller that already has IM Pending bit active.

MM Reject—This response indicates that an address contention was detected on the Target Memory node in cases where that node is not an Intervention Master node and a full address compare was encountered against another controller that already has MM Pending bit active (MM stands for Memory Master, also referred to as the Target Memory node).

Read-Only Hit—This response is generated at a node if the cache ownership state is found Read Only and the IM bit is off.

Miss—This response is generated at a node if the target address does not exist within the cache directory.

Further, in FIG. 3, in block 30d, upon receiving the combined response 3c, each of the remote nodes 32, 33 and 34 then proceeds to manage their respective local cache states to ensure that upon completing processing of their respective requests the state of the line within the system is coherently managed.

According to an exemplary embodiment, for fetch type operations, once the directory search in the remote cache indicates an IM hit, in block 30e, the Intervention Master node (i.e., remote node 34), for example, starts sourcing the data from the respective cache and forwards the data to the requesting node 31 via a data response 3d. According to another exemplary embodiment, in the case when there is no Intervention Master in the system 30, the Target Memory node (i.e., remote node 34), for example, sources the data and issues the data response 3d. The present invention is not limited to the Intervention Master node or the Target Memory node being a particular node and may vary, accordingly.

According to an exemplary embodiment, in block 30f, when a store operation is ongoing the data is being sourced from the requesting node 31 via a data response 3d' after the coherency is established in the system 30. The data can be routed to a Target Memory node for a subset of the store operations or to the Intervention Master node for another subset of the store operations.

In block 30g, when the coherent handling of the line within the respective remote nodes is completed, each remote node 32, 33 and 34 will send a final response 3f to the requesting node 31. According to the current exemplary embodiment, for each local controller in the system 30 there is a dedicated controller on all remote nodes 31, 32, 33 and 34. The final response 3f is necessary to be able to ensure that the local controller does not get reloaded with new operation before the previous one finished on all remote nodes 32, 33 and 34. After receiving a final response 3f from each of the remote nodes 32, 33 and 34, in block 30h, the requesting node 31 is then assured that system coherency has been obtained and exclusivity of the target line is returned to the requesting processor, 3e.

Figure 4A:
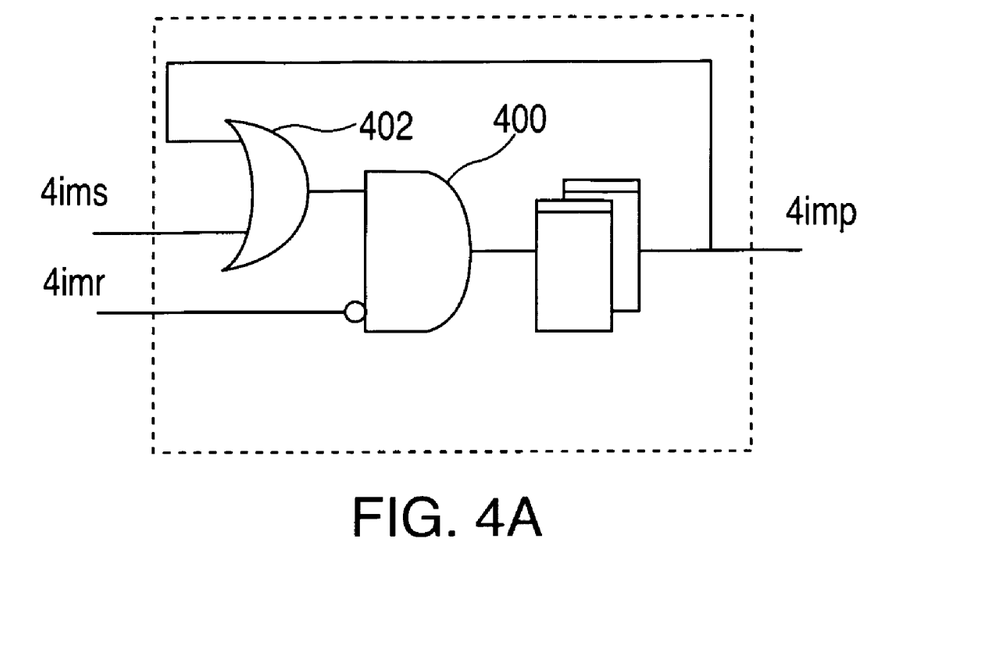
FIGS. 4A and 4B illustrate an address protection mechanism that can be implemented within embodiments of the present invention.

FIG. 4A illustrates the logic diagram for Intervention Master (IM) Pending latches within a cache subsystem where 4ims represents the set condition for the IM Pending bit, 4imr represents the reset conditions and 4imp is the actual IM Pending bit. The following is a list of set (4ims) and reset (4imr) conditions for the IM Pending hit 4imp:

| IM Pending Set Conditions (4ims) |
| --- |
| Cache Ownership State = IM and no IM reject condition during the initial directory look up |
| Incoming LRU Castout command on Target Memory node |
| Incoming IM Hit Combined Response on Target Memory node for a subset of Store commands that are targeting memory |
| On the Requesting node when non reject combined response |

| IM Pending Reset Conditions (4imr) |
| --- |
| Controller no longer valid |
| On the Requesting node when all Partial responses received for a subset of store operations |
| On the Requesting node when all Partial responses received and Store data sent on the Fabric for a subset of store operations |
| On the Requesting node when all but one Final responses received and Store data sent on the Fabric for a subset of store operations |

The IM Pending latch and associated controlling logic are in every controller on each of the remote nodes 32, 33 and 34, to generate an IM Reject response for conflicting responses at the node where the 4imp is set. As shown in FIG. 4A, from the output of the logic gate 400, the 4imp is reset if any of the reset conditions 4imr mentioned above are true. If none of the reset conditions 4imr are true, then the 4imp is set if the output of the OR gate (i.e., the set conditions 4ims) are true.

According to an exemplary embodiment, when a fetch operation is being processed when a directory search is performed on a remote node (32, 33 or 34) which is the Intervention Master (IM), the controller responsible for this operation sets the IM Pending bit which is used to prevent another requester from using the data from the respective cache, until the current request completes processing of the data. Setting of the IM Pending ensures that only one controller can be actively working with a line address/data at a given time.

According to another exemplary embodiment, when no Intervention Master node exists in the system 30, one of nodes (31, 32, 33 or 34) with the line address target memory attached is used to determine the point of coherency in the system 30, as previously mentioned above, this node is referred to as the "Target Memory" node or "Target" node. When an operation lands on the Target Memory node, the controller responsible for the handling of the operation sets a Memory (MM) Pending bit. The MM Pending bit prevents other controllers from fetching the data from the cache while the current operation is in progress. According to an exemplary embodiment, the MM Pending bit is ignored when an Intervention Master node exists in the system 30 for a specified address.

At the time of the directory search, the MM Pending bit is set on the Target Memory node when the IM bit in the directory state is not active and no address contentions are detected for that line against another controller that has the MM Pending bit set, this is referred to as an "MM Reject".

Figure 4B:
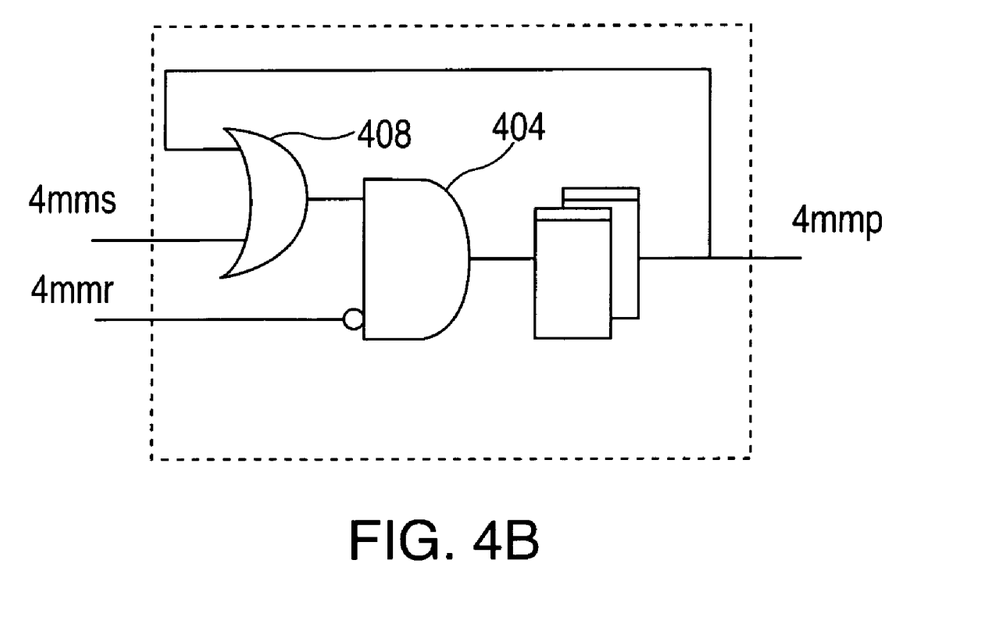

FIG. 4B illustrates the logic diagram for Memory Master (MM) Pending latches within a cache subsystem where 4mms represents the set condition for the MM Pending bit, 4mmr represents the reset condition and 4mmp is the actual MM Pending bit. The following is a list of set (4mms) and reset (4mmr) conditions for the MM Pending bit 4mmp:

| MM Pending Set Conditions (4mms) |
| --- |
| On the Target Memory node when Cache Ownership State is not IM and no IM reject or MM Reject condition |

| MM Pending Reset Conditions (4mmr) |
| --- |
| Controller no longer valid |

As shown in FIG. 4B, from the output of the logic gate 404, the 4mmp is reset if any of the reset conditions 4mmr mentioned above are true. If none of the reset conditions 4mmr are true, then the 4mmp is set if the output of the OR gate 408 (i.e., the set conditions 4mms) are true.

Exemplary embodiments of the present invention involve the way fabric coherency is being established across multiple nodes in a system with dedicated remote resources and also the conditions triggering a set and reset of the IM Pending bit.

According to an exemplary embodiment, for fetch type of operations, the IM Pending bit is being set on the Intervention Master node at the time when a fetch controller handling this operation is loaded. At that time, an IM Hit partial response 3p is sent back to the requesting fetch controller of the requesting node 31. Once the controller receives the partial responses 3p, the controller sets the IM Pending bit and continues to protect the address until it receives the data response 3d and all final responses 3*f* from the remote controllers of the remote nodes 32, 33 and 34 and finishes installing the data in the local cache. Both the local and the remote fetch controllers reset their IM Pending (and MM Pending) bits at the time when they reset their valid bits. If another request is received targeting the same specified address as an operation currently in progress, the manner in which the IM Pending bits are set and reset ensures that the new request will be rejected and not see an IM Hit response from one node and a IM Reject from another node, due to the full address compare against another controller with IM Pending active.

According to another exemplary embodiment, store operations follow a similar fabric coherency protocol which includes address broadcast 3*a*, directory searching, and partial 3*p*, combined responses 3*c*, a data response and final response 3*f* even though in some cases no coherency needs to be established during directory searching on the remote nodes 32, 33 and 34. The partial responses 3*p* are being used on the requesting node 31 to determine if the coherency was established and no reject condition is detected and/or to validate that the remote controller which is going to perform the store operation starts to protect the specified address. As soon as the coherency is established the local store controller can forward the data to the remote node (32, 33 or 34) which is going to perform the store operation. When all remote controllers complete all necessary sequences, which may include storing data in the cache or memory or removing a copy of the data from a remote cache, the controllers send a final response 3*f* back to the local controller of the requesting node 31. The local controller waits for all final responses 3*f* before returning the response 3*e* to the requesting processor, if necessary.

Further, for store operations, if we follow the same aforementioned rules for setting and resetting the IM Pending bits, a scenario may occur where one node is rejecting an operation due to an IM Pending compare, while another node allows the operation to proceed because it is the Intervention Master node and no IM Pending compares was detected on the node containing the IM copy of the data.

In order to prevent this scenario from arising, in the preferred embodiment for store operations which need to perform the store in the memory, but first needs to establish coherency, the IM Pending bit is set on the Target Memory Node after the coherency in the system 30 is established and a non-reject combined response 3*c* is received. The remote controller resets the IM Pending bit when it completes processing of the store operation.

To avoid cases where a remote controller stops protecting the address while the local controller is still protecting it, for store type operations that need to perform a store to remote memory and the request originated from the IM node (no need to establish coherency), it is safe to reset the IM Pending right after receiving all of the partial responses 3*p*, as this ensures that the remote controller starts protecting the data before the local controller stops protecting the data (as the remote controller sets IM pending upon being loaded and located on the Target Memory node).

In the other case for store operations where system coherency needs to be obtained prior to initiating the store, there is no IM hit detected on the local node, and the store operation needs to be performed in the remote cache or memory, the data can only be sent after the coherency point has been established and non-reject partial responses 3*p* have been received. At this point it is safe to reset the IM Pending bit as the highest coherency point in the system is the Target Memory node. This ensures that an IM hit detected on one node and an IM Pending compare against a local controller on another node.

The method according to exemplary embodiments of the present invention prevents various issues related to window conditions where a controller initially detects a reject condition due to an IM Pending compare against another controller, that triggers an IM Reject partial response to be sent to the local controller, and an IM Hit combine response 3*c* arriving as a result on a IM hit detected on another node, that allows the respective controller to process the operation. This scenario could result in a requestor proceeding with one operational sequence upon receiving a reject response, and having to change its course of action upon observing a high coherency state response for its request. At which point damage to a local cache state could have been irreversibly done.

Figure 5:
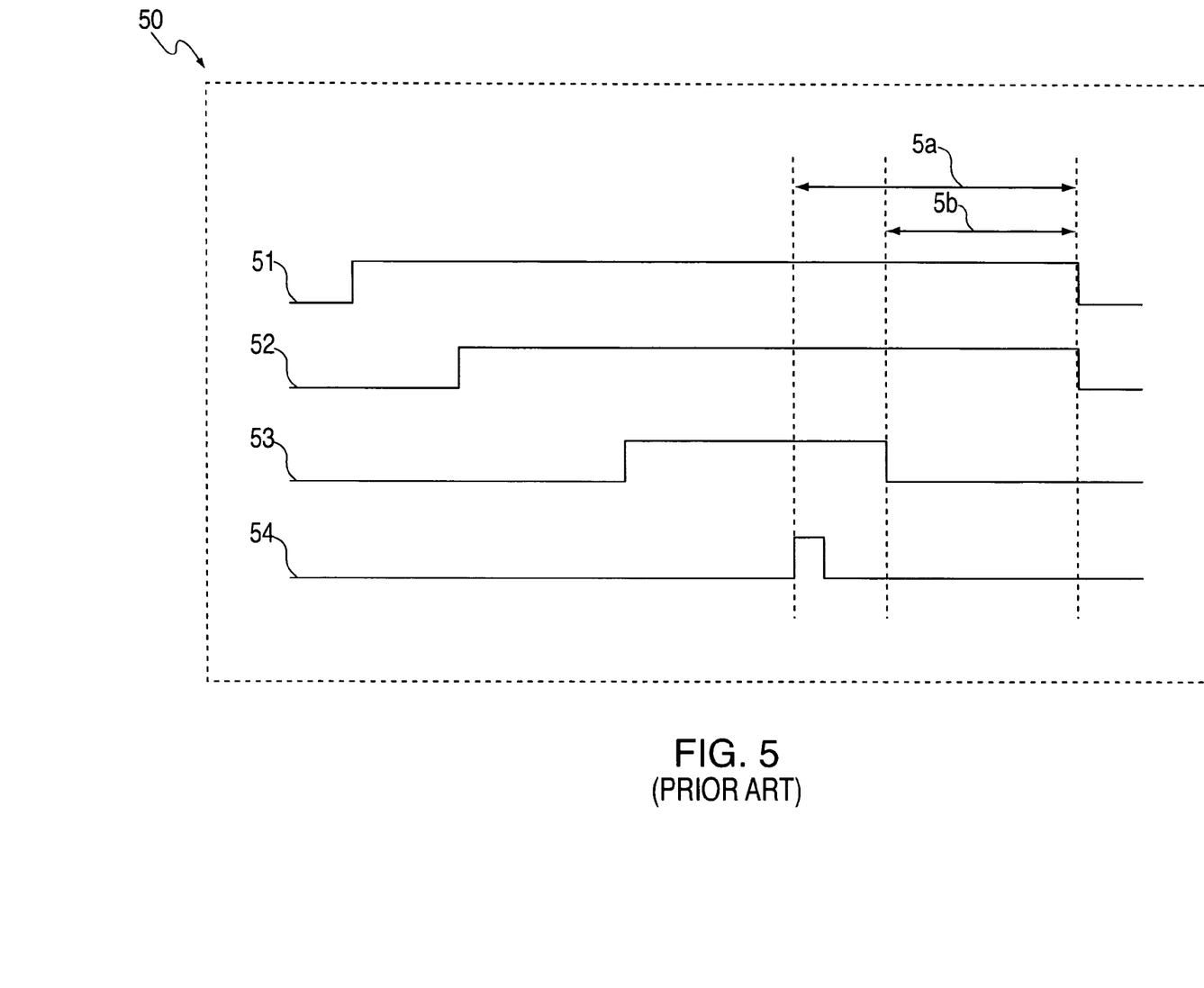
FIG. 5 illustrates a conventional cache coherency management scheme.

FIG. 5 illustrates the timing diagram for one store operation in a conventional system which allows conflicting responses. As shown in FIG. 5, line 51 represents the duration of the store operation, line 52 displays the time when the requesting node is protecting the address through IM or MM Pending bit. In this case, the requesting node starts protecting the address at the time when it receives non-reject partial responses and drops the protection when the store operation completes, along with the controller valid. Further, line 53 shows the window when the address is being protected on the node that is performing the actual store operation. This can be an Intervention Master node or a Target Memory node, for example. In addition, line 54 represents the time when the store data is routed to the remote node. Once the remote node completes the store operation, the remote node sends a final response to the requesting node and then resets the IM or MM Pending bit and the valid bit. Time interval 5*a* corresponds to the window between data being launched on the Fabric and the time when the requesting node drops the address protection. Time interval 5*b* covers the window between the Intervention Master node or the Target Memory node dropping the address protection and the completion of the store operation. Further, as shown in FIG. 5, there is a window where if a new request targeting the same address is initiated during window 5*b*, the requesting node for the store operation will reject the operation while the Intervention Master node allows the operation to complete.

Figure 6:
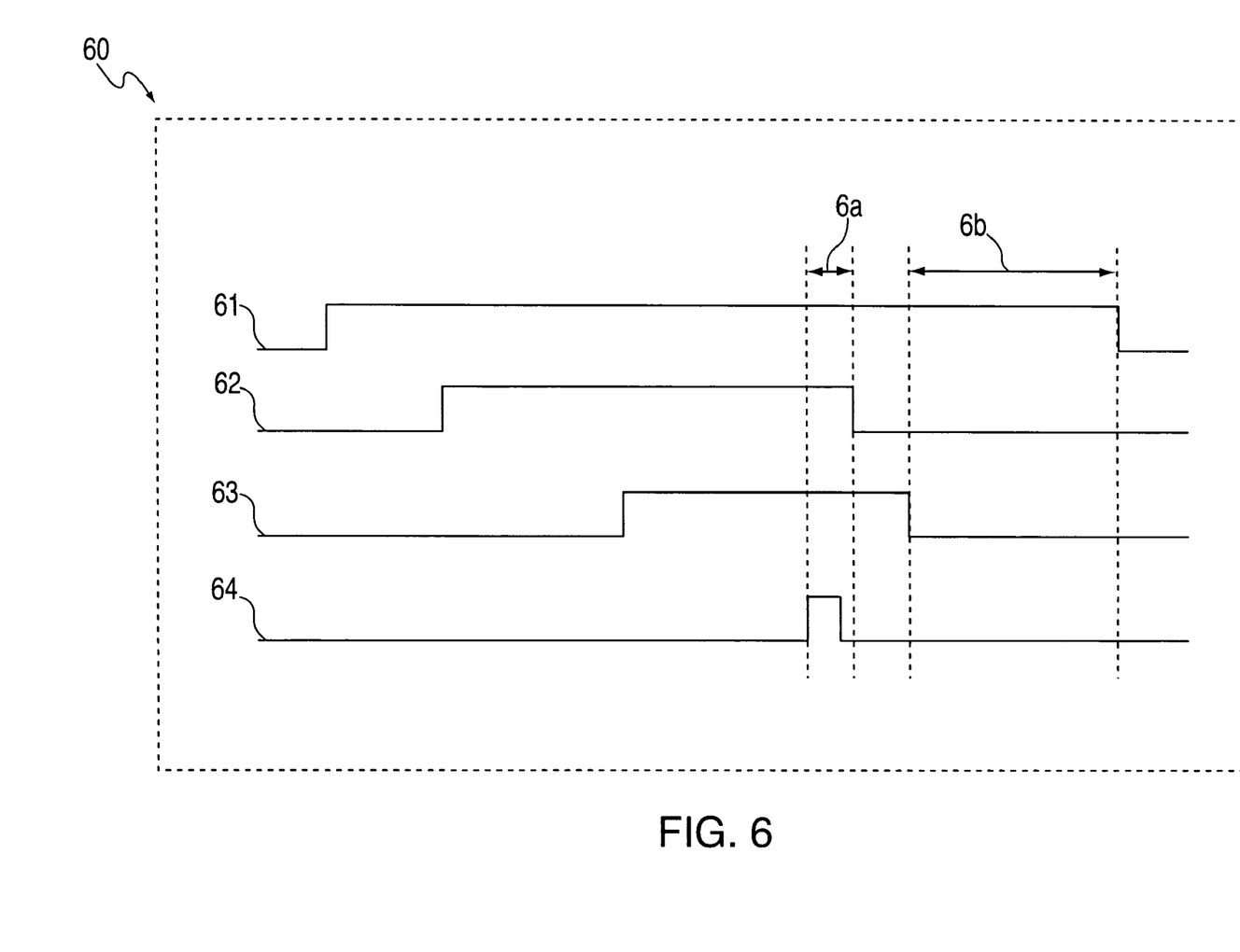
FIG. 6 illustrates an improved coherency management scheme with built-in conflicting response avoidance that can be implemented within embodiments of the present invention.

FIG. 6 illustrates the timing diagram for a store operation in a system having a built in avoidance for conflicting responses which can be implemented within embodiments of the present invention. As shown in FIG. 6, 61 represents the duration of the store operation, and line 62 displays the time when the requesting node 31 is protecting the specified address through IM or MM Pending bit. According to an exemplary embodiment, the requesting node 31 starts protecting the address at the time when non-reject partial responses are received and minimally reduces the protection after it launches the store data to the Intervention Master node or Target Memory Node. Line 63 illustrates the window when the address is being protected on the node which is performing the actual store (i.e., an Intervention Master node or a Target Memory node). Line 64 represents the time when the store data is routed to the remote node (32, 33 or 34). Once the remote node (32, 33 or 34) is done with the operation, the remote node (32, 33 or 34) sends final response 3*f* to the requesting node and then reset the IM or MM Pending bit and the valid bit. Time interval 6*a* corresponds to the window between data being launched on the Fabric and the time when the requesting node 31 drops the address protection. Time interval 6*b* covers the window between the Intervention Master node or the Target Memory node (i.e., remote node 34 as shown in FIG. 3) dropping the address protection and the completion of the store operation. The diagram illustrated in FIG. 6, shows that there is no longer a window where if a new request targeting the same specified address during window 6b is initiated, the requesting node 31 and the Intervention Master node or Target Memory node will not return conflicting partial responses.

An exemplary embodiment of the present invention provides a method by which address protection follows the respective data, after ensuring that the node which will process the data has started protecting the address, in order to avoid conflicting responses where one node is rejecting an operation due to contention while another node in the multi-node system allows the operation to complete.

Technical effects and benefits of this invention includes a enhanced cache coherency protocol that allows simplified data integrity management and achieves better performance for workloads with high address contention.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for a cache coherency protocol with built in avoidance for conflicting responses in a multi-node system, the method comprising:
    initiating a processor request to a shared level of cache in a requesting node of the plurality of nodes;
    broadcasting the processor request to a plurality of remote nodes when the processor request encounters a local cache miss at the requesting node;
    performing a directory search of a cache of each of the plurality of remote nodes to determine a state of a target line's address in each of the plurality of remote nodes and an associated ownership state of said target line's address;
    receiving, at the requesting node, partial responses from each of the plurality of remote nodes, the partial responses including the ownership state of the target line from each of the plurality of remote nodes;
    performing, in the requesting node, a consistency check on the partial responses, the consistency check determining if there are any inconsistencies in the partial responses;
    merging the partial responses together in the requesting node, to form a combined response, responsive to determining that there are no inconsistencies in the partial responses;
    broadcasting the combined response from the requesting node to each of the plurality of remote nodes;
    protecting the target line address by setting a pending bit at each of the plurality of remote nodes responsive to determining that at least one of the received partial response is a hit response;
    sourcing data from a respective remote cache during a fetch operation, and forwarding the data to the requesting node while protecting the data, responsive to determining that the directory search indicates an Intervention Master (IM) or a Target Memory Node on a remote node;
    sourcing the data from the requesting node during a store operation, and protecting the data while forwarding the data to the Intervention Master (IM) or the Target Memory node after coherency has been established in the multi-node system; and
    receiving a final response from each of the plurality of remote nodes and returning a completion response to the requesting processor, responsive to determining the completion of the cache coherent operations.

2. The method of claim 1, wherein performing a directory search of each of the plurality of remote cache comprises:
    when a cache hit is detected on a remote node, determining whether the remote cache is an Intervention Master (IM) for a specified address which indicates a highest coherency point in the multi-node system for the specified address; and
    setting an Intervention Master (IM) Pending on the remote node where the Intervention Master is determined and protecting the specified address during a window where data is being updated or moved.

3. The method of claim 2, wherein setting the Intervention Master (IM) Pending further comprising:
    setting the Intervention Master (IM) Pending on the remote node when no address contentions are detected for the target line against another controller which has the Intervention Master (IM) Pending set.

4. The method of claim 2, wherein when the fetch operation is being processed and the directory search is conducted on the remote node which is the Intervention Master (IM), the respective controller sets the Intervention Master (IM) Pending to prevent another requester from using the data from the cache of the remote node, until the fetch operation is completed.

5. The method of claim 2, wherein when the Intervention Master (IM) is not determined to be in the multi-node system, setting a Memory Master (MM) Pending on the Target Memory node via the respective controller, to prevent other controllers from fetching the data from the memory while a current operation is in progress.

6. The method of claim 5, wherein set conditions for the Memory Master (MM) Pending comprises setting the Memory Master (IM) pending on the Target Memory node when cache ownership state is not an Intervention Master and no Intervention Master (IM) reject or Memory Master (MM) reject condition is found, and when a controller is no longer valid.

7. The method of claim 2, wherein setting of the Intervention Master (IM) Pending on the remote node comprises:
setting the Intervention Master (IM) Pending on the remote node where the Intervention Master (IM) is determined, when the controller of the requesting node is loaded and a partial response indicating an Intervention Master (IM) hit is sent to the controller of the requesting node, the controller sets the Intervention Master (IM) Pending and protects the address until the requesting node receives partial responses from each of the remote nodes.

8. The method of claim 7, wherein when it is determined that the requesting node is the Intervention Master (IM), the Intervention Master (IM) Pending is set during loading of the controller of the requesting node.

9. The method of claim 1, further comprising applying a partial/combined response wherein a response coherency ordering comprises:
1) Intervention Master (IM) hit;
2) Intervention Master (IM) reject;
3) Memory Master (MM) reject;
4) Read-Only Hit; and
5) Miss.

10. The method of claim 9, wherein set conditions for the Intervention Master (IM) Pending comprise cache ownership state, incoming LRU castout command on the target memory node, incoming Intervention Master (IM) hit combined response on the target memory node, or on the requesting node when a non-reject combined response is detected.

11. The method of claim 10, wherein reset conditions for the Intervention Master (IM) Pending comprise resetting when a controller is no longer valid, on the requesting node when all partial responses received, on the requesting node when all partial responses received and store data is sent, on the requesting node when all final responses except one final response have been received and store data is sent.

12. The method of claim 5, wherein the requesting node starts protecting the specified address at the time when non-reject partial responses are received and drops the protection after forwarding the data to the remote node which is the Intervention Master (IM) or the Target Memory node, when the remote node is finished with the operation, the remote node sends a final response to the requesting node and then resets the Intervention Master (IM) Pending or Memory Master (MM) Pending.

13. A computer program product comprising a non-transitory tangible computer useable storage medium including a computer readable program, wherein the computer readable program when executed on a computer causes the computer to implement a method for a cache coherency protocol with built in avoidance for conflicting responses in a multi-node system, the method comprising:
initiating a processor request to a shared level of cache in a requesting node of the plurality of nodes;
broadcasting the processor request to a plurality of remote nodes when the processor request encounters a local cache miss at the requesting node;
performing a directory search of a cache of each of the plurality of remote nodes to determine a state of a target line's address in each of the plurality of remote nodes and an associated ownership state of said target line's address;
receiving, at the requesting node, partial responses, the partial responses from each of the plurality of remote nodes, the partial responses including the ownership state of the target line from each of the remote nodes to the requesting node;
performing, in the requesting node, a consistency check on the partial responses, the consistency check determining if there are any inconsistencies in the partial responses;
merging the partial responses together, in the requesting node, to form a combined response, responsive to determining that there are no inconsistencies in the partial responses;
broadcasting the combined response from the requesting node to each of the plurality of remote nodes;
protecting the target line address by setting a pending bit at each of the plurality of remote nodes responsive to determining that at least one of the received partial response is a hit response;
sourcing data from the respective remote cache during a fetch operation and forwarding the data to the requesting node while protecting the data, responsive to determining that the directory search indicates an Intervention Master (IM) or a Target Memory Node on a remote node;
sourcing the data from the requesting node during a store operation, and protecting the data while forwarding the data to the Intervention Master (IM) or the Target Memory node after coherency has been established in the multi-node system; and
receiving a final response from each of the plurality of remote nodes and returning a completion response to the requesting processor, responsive to determining the completion of the cache coherent operations.

14. The computer program product of claim 13, wherein performing a directory search of each of a plurality of remote caches comprises:
when a cache hit is detected on a remote node, determining whether the remote cache is an Intervention Master (IM) for a specified address which indicates a highest coherency point in the multi-node system for the specified address; and
setting an Intervention Master (IM) Pending on the remote node where the Intervention Master is determined and protecting the specified address during a window where data is being updated or moved.

15. The computer program product of claim 14, wherein setting the Intervention Master (IM) Pending further comprising:
setting the Intervention Master (IM) Pending on the remote node when no address contentions are detected for the target line against another controller which has the Intervention Master (IM) Pending set.

16. The computer program product of claim 14, wherein when the fetch operation is being processed and the directory search is conducted on the remote node which is the Intervention Master (IM), the respective controller sets the Intervention Master (IM) Pending to prevent another requester from using the data from the cache of the remote node, until the fetch operation is completed.

17. The computer program product of claim 14, wherein when the Intervention Master (IM) is not determined to be in the multi-node system, setting a Memory Master (MM) Pending on the Target Memory node via the respective controller, to prevent other controllers from fetching the data from the memory while a current operation is in progress.

18. The computer program product of claim 14, wherein setting of the Intervention Master (IM) Pending on the remote node comprises:
setting the Intervention Master (IM) Pending on the remote node where the Intervention Master (IM) is determined, when the controller of the requesting node is loaded and a partial response indicating an Intervention Master (IM) hit is sent to the controller of the requesting node, the controller sets the Intervention Master (IM) Pending and protects the address until the requesting node receives partial responses from each of the remote nodes.

19. A multi-node system comprising:
a plurality of nodes interconnected with each other, each node comprising:
- a plurality of processors;
- a shared level of cache in communication with the plurality of processors; and
- a plurality of controllers configured to perform cache coherent operations, the system performing:

initiating a processor request to the shared level of cache in a requesting node of the plurality of nodes;

broadcasting the processor request to a plurality of remote nodes when the processor request encounters a local cache miss at the requesting node;

performing a directory search of each of a cache of each of the plurality of remote nodes to determine a state of a target line's address in each of a plurality of remote nodes and an associated ownership state of said target line's address;

receiving, at the requesting node, partial responses from each of a plurality of remote nodes, the partial responses including the ownership state of the target line from each of the remote nodes;

performing, in the requesting node, a consistency check on the partial responses, the consistency check determining if there are any inconsistencies in the partial responses;

merging the partial responses together in the requesting node, to form a combined response, responsive to determining that there are no inconsistencies in the partial responses;

broadcasting the combined response from the requesting node to each of the plurality of remote nodes;

protecting the target line address by setting a pending bit at each of the plurality of remote nodes responsive to determining that at least one of the received partial response is a hit response;

sourcing data from the respective remote cache during a fetch operation, and forwarding the data to the requesting node while protecting the data, responsive to determining that the directory search indicates an Intervention Master (IM) or a Target Memory Node on a remote node;

sourcing the data from the requesting node during a store operation, and protecting the data while forwarding the data to the Intervention Master (IM) or the Target Memory node after coherency has been established in the multi-node system; and receiving a final response from each of the plurality of remote nodes and returning a completion response to the requesting processor, responsive to determining the completion of the cache coherent operations.

\* \* \* \* \*